Feb. 4, 1936.  G. J. HUNTLEY ET AL  2,029,823
FILLING AND CLOSING MACHINE
Filed July 28, 1932   9 Sheets-Sheet 5
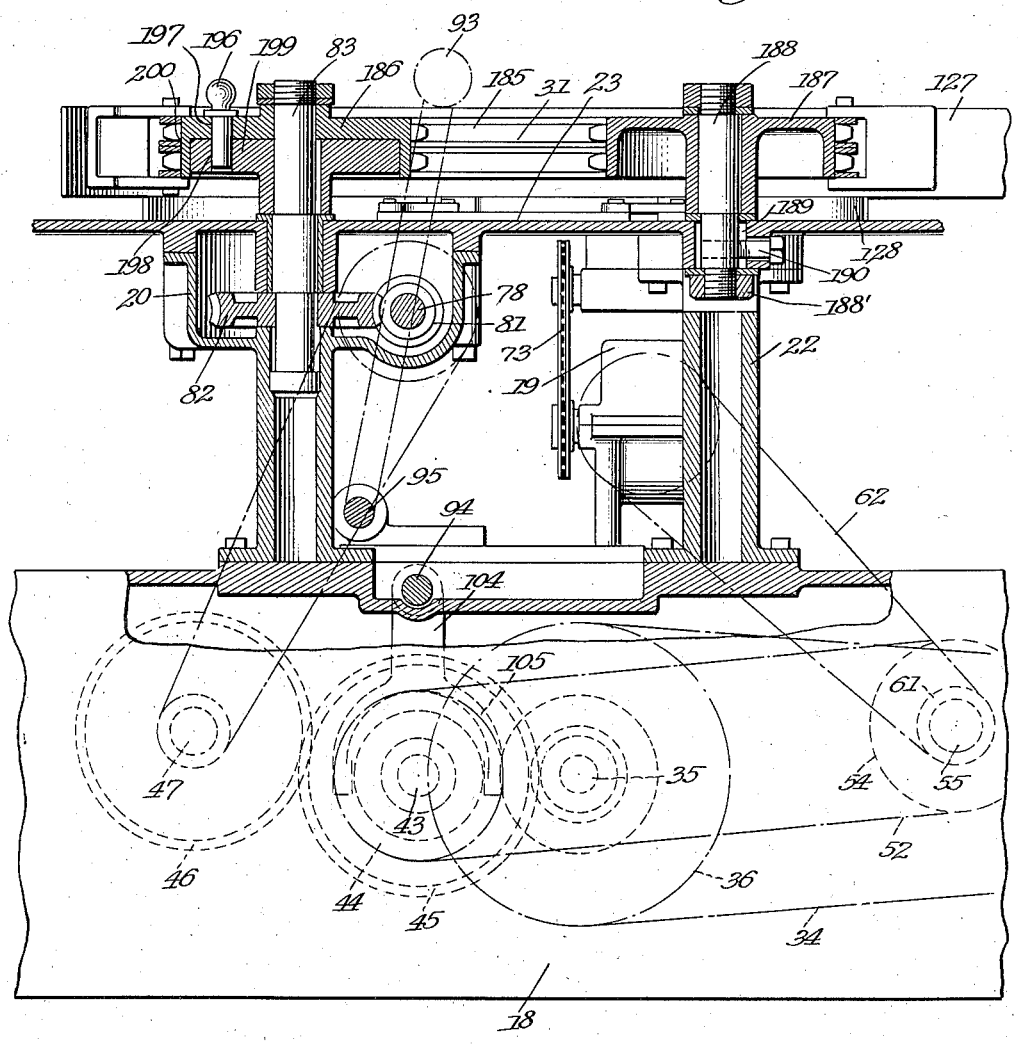
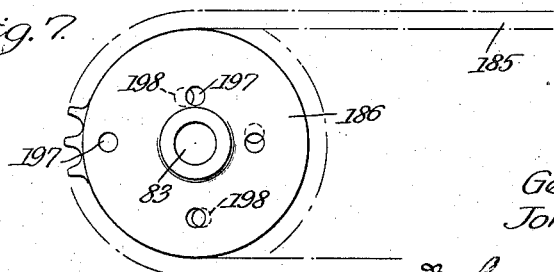
Inventors
George J. Huntley,
John S. Bartley,

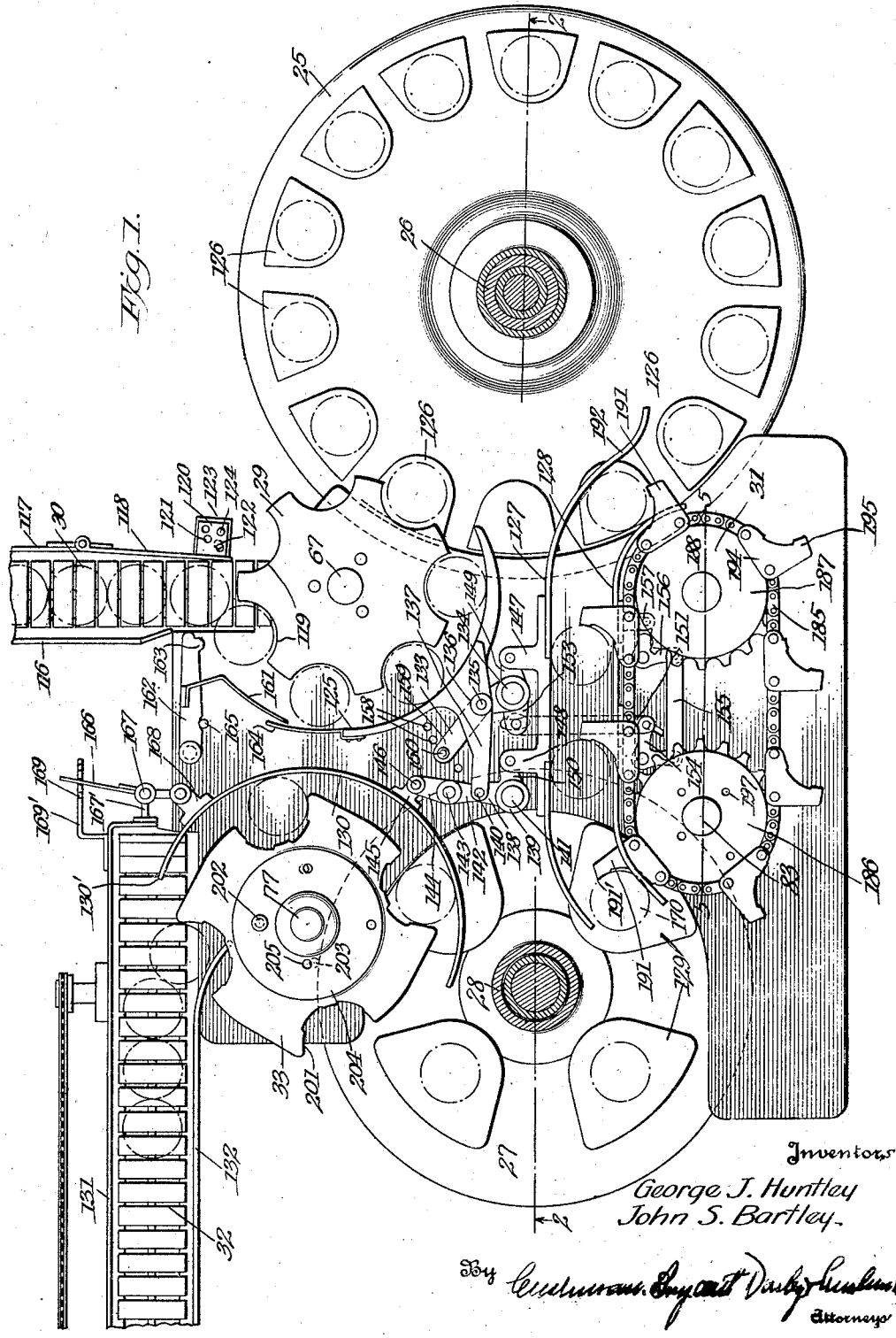

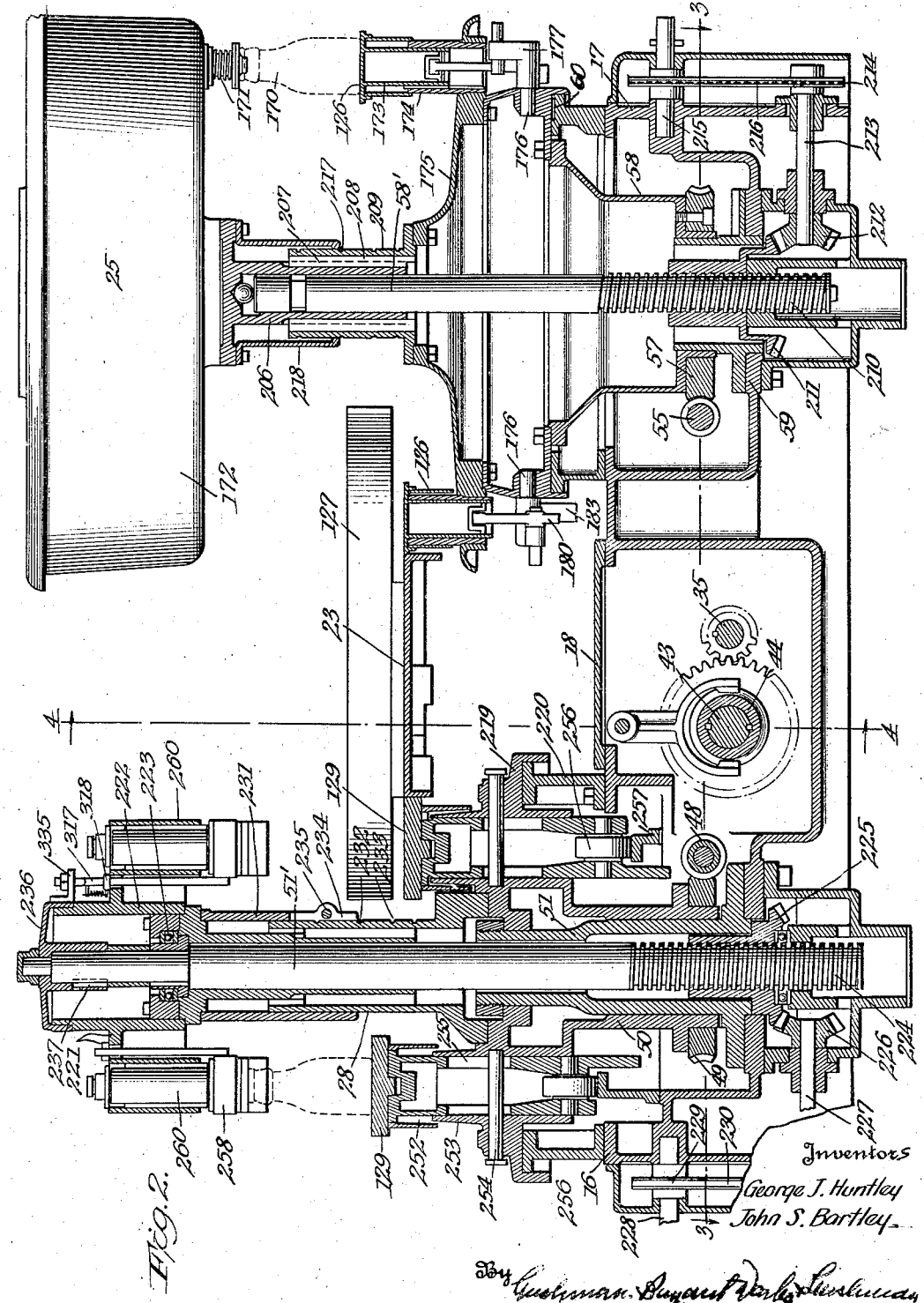

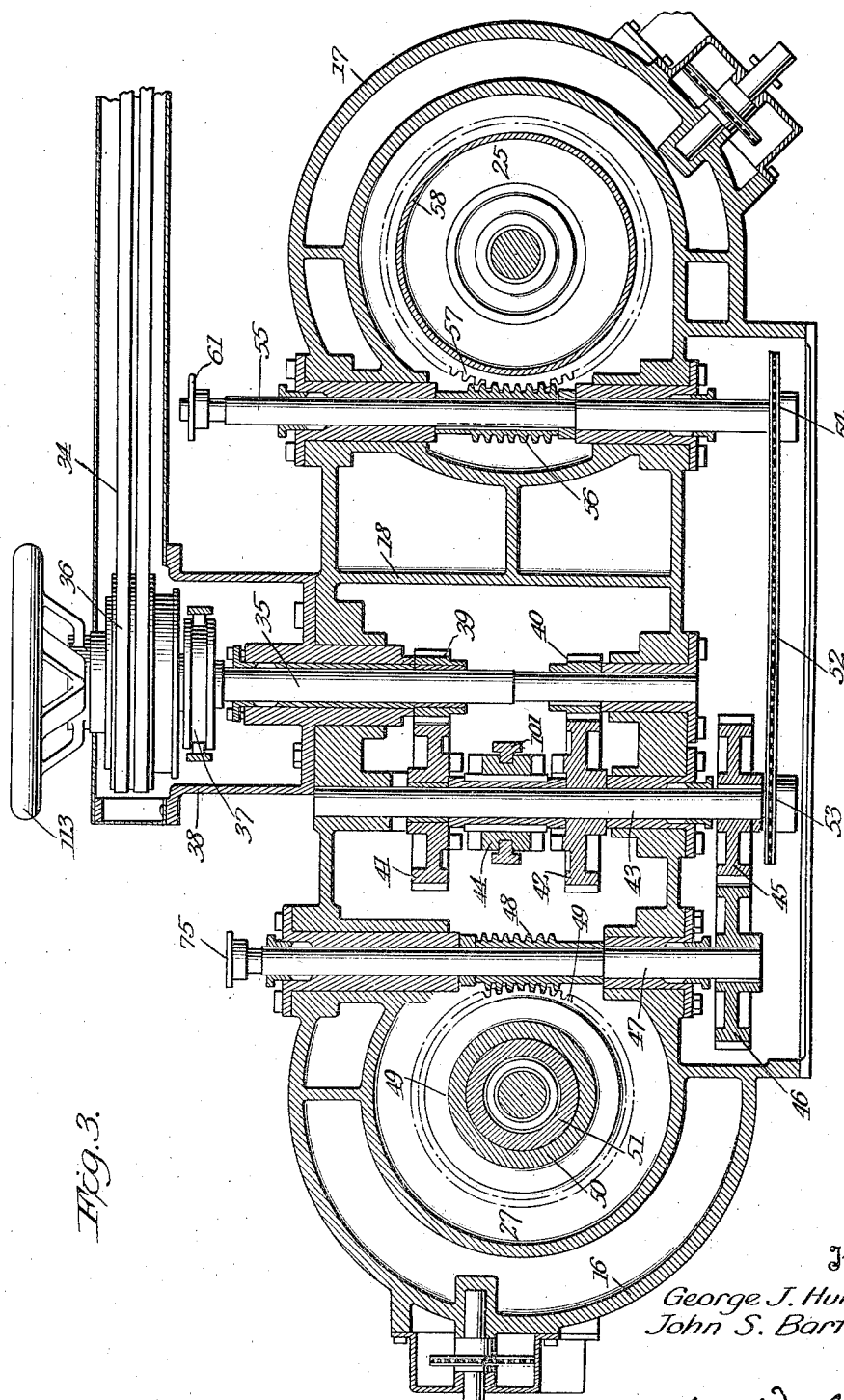

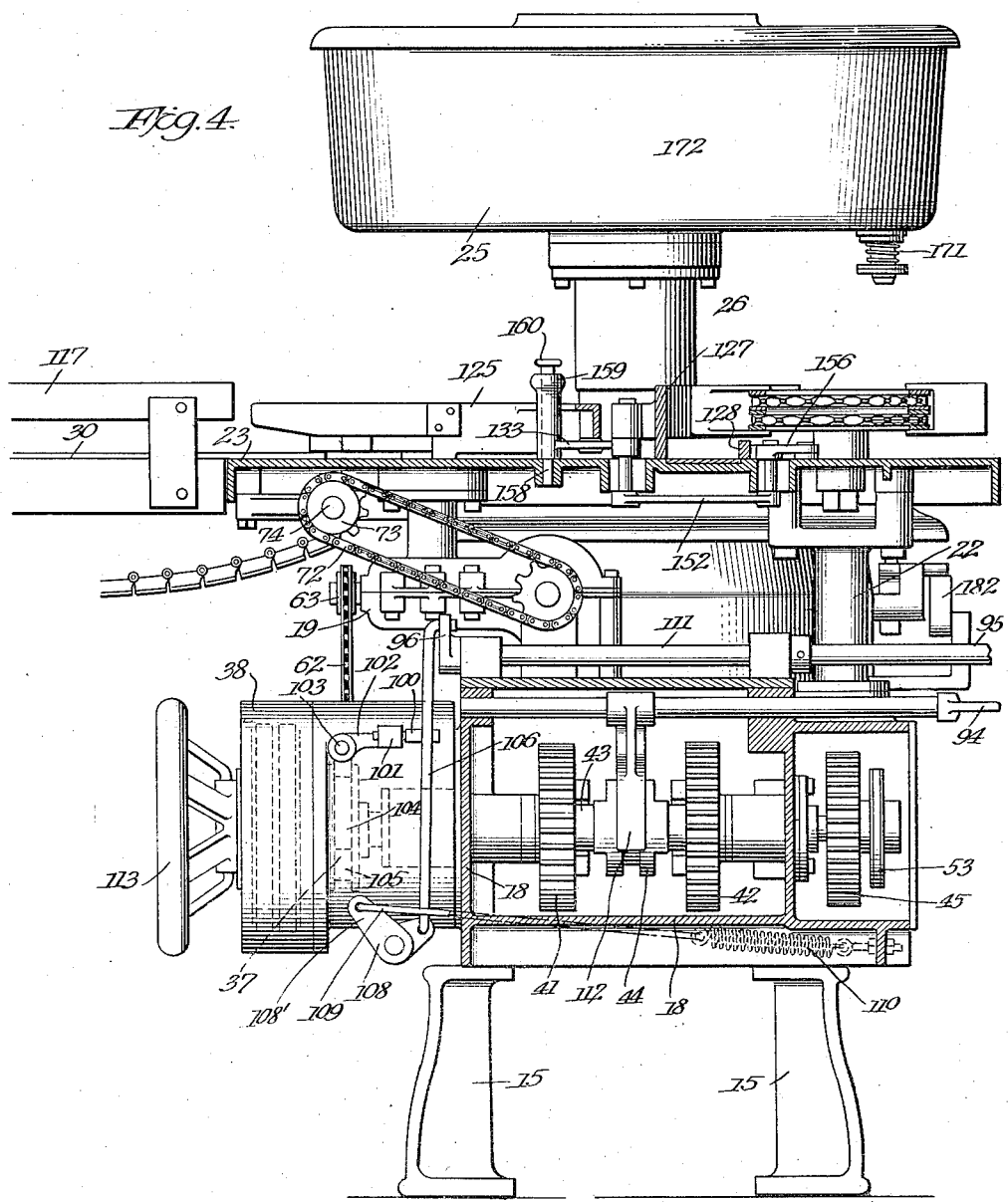

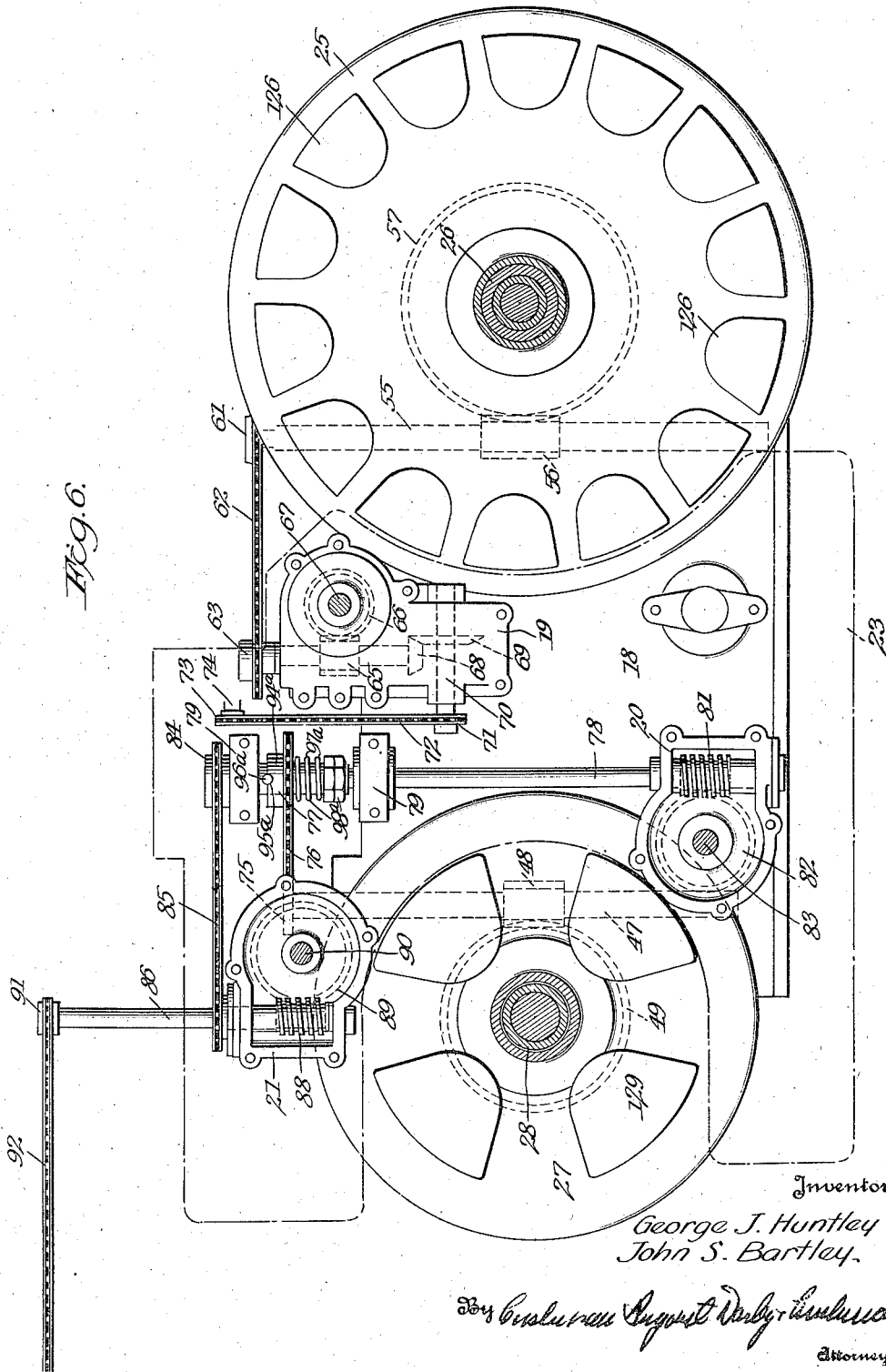

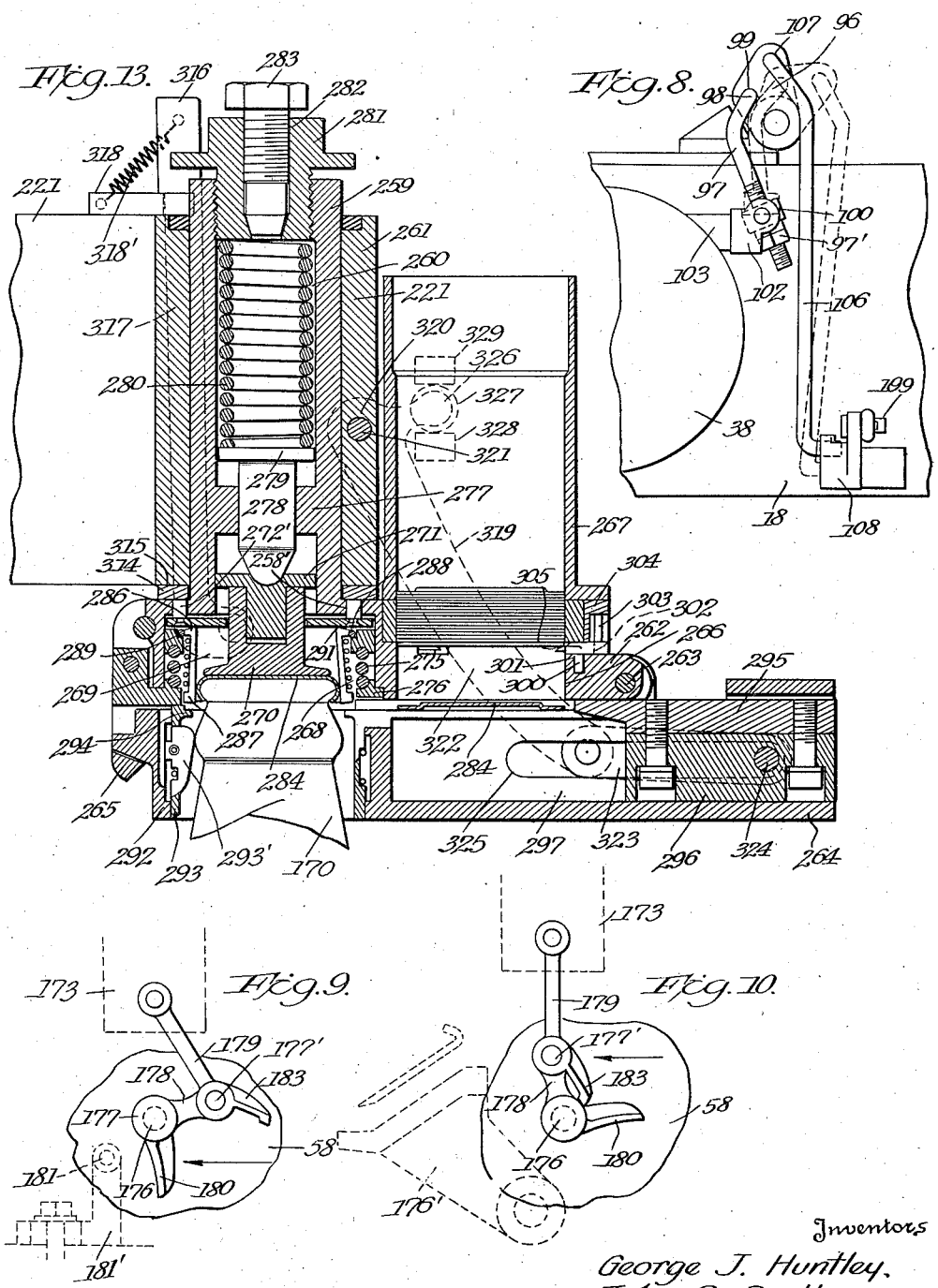

Feb. 4, 1936.   G. J. HUNTLEY ET AL   2,029,823
FILLING AND CLOSING MACHINE
Filed July 28, 1932    9 Sheets-Sheet 8
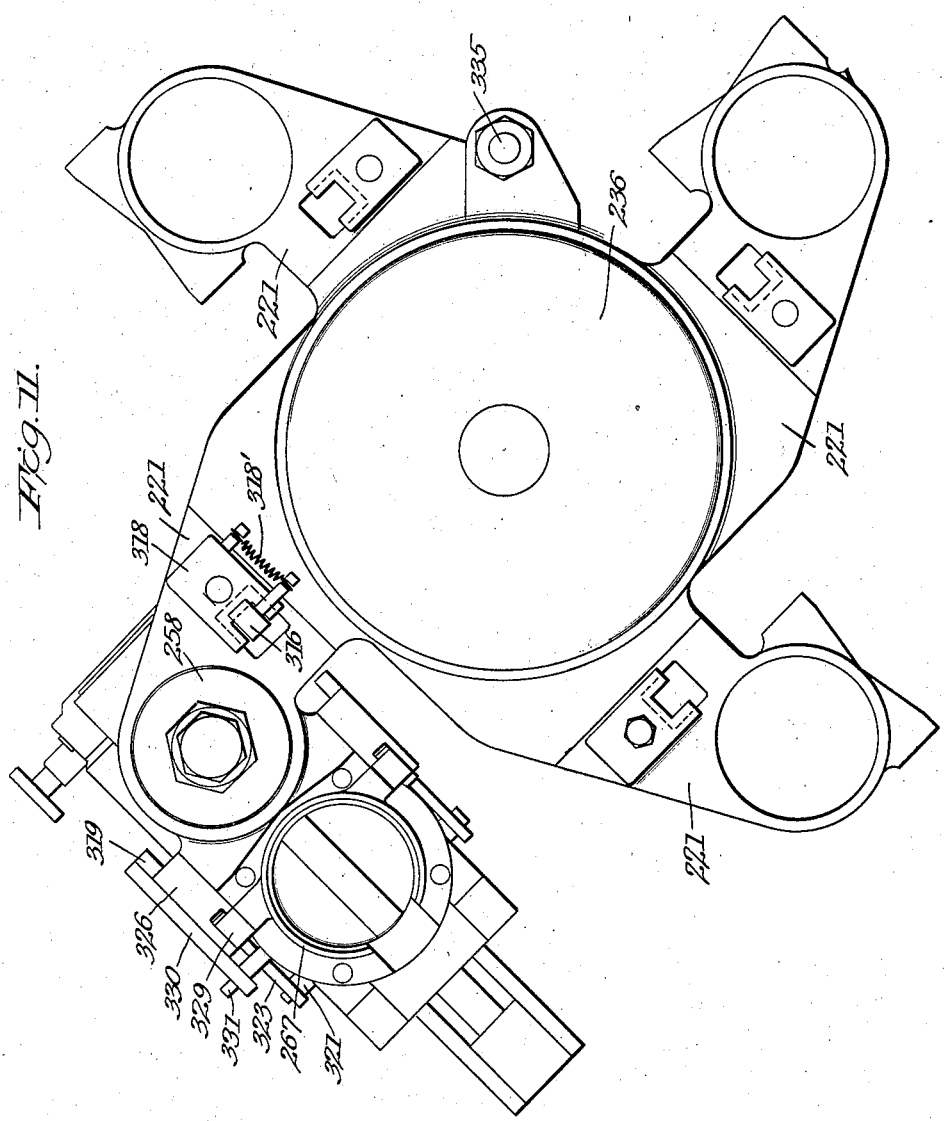
Inventors
George J. Huntley,
John S. Bartley.

Feb. 4, 1936.  G. J. HUNTLEY ET AL  2,029,823
FILLING AND CLOSING MACHINE
Filed July 28, 1932  9 Sheets-Sheet 9
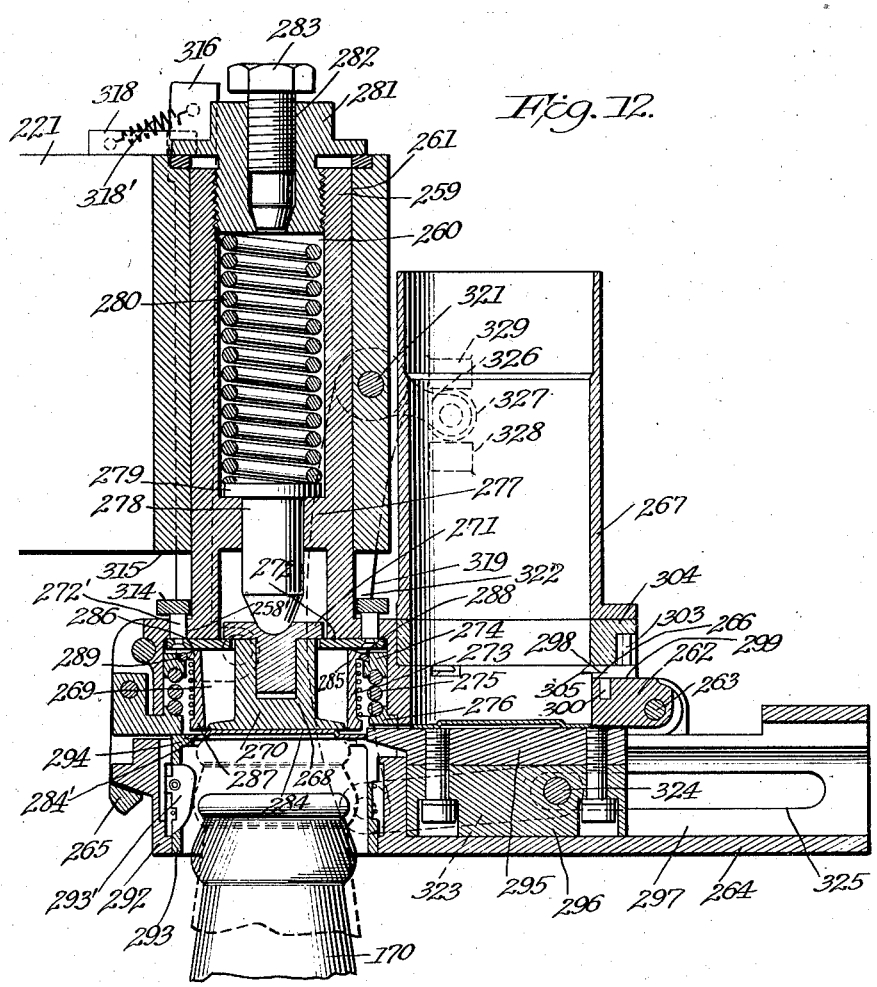
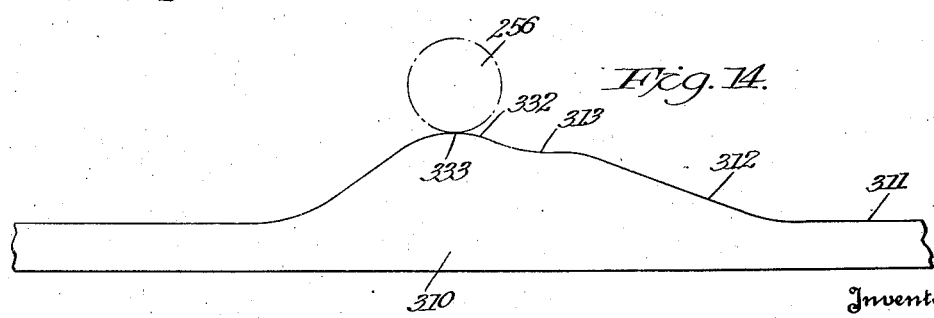
Inventors
George J. Huntley,
John S. Bartley,
Attorneys Patented Feb. 4, 1936

2,029,823

UNITED STATES PATENT OFFICE 2,029,823

FILLING AND CLOSING MACHINE

George J. Huntley and John S. Bartley, Baltimore, Md., assignors to Crown Cork & Seal Company, Inc., Baltimore, Md., a corporation of New York Application July 28, 1932, Serial No. 625,455

8 Claims. (Cl. 226—75)

Our invention comprises a filling and closing machine, and more particularly, a machine for filling and capping milk bottles or receptacles.

Filling and closing or capping machines usually comprise a work table to which empty bottles may be fed by an in-feed conveyor belt and from which the bottles are removed by an outfeed conveyor belt. A filling mechanism and a capping mechanism are mounted at opposite sides of the work table, and conveyors are usually provided on the work table to move the bottles from the in-feed conveyor belt to the filling mechanism and from the capping mechanism to the out-feed conveyor. A transfer mechanism is also usually provided on the work table to move the bottles across the work table from the filling mechanism to the capping mechanism. Guides are provided on the work table to direct the movement of the bottles between the conveyor belts and the filling and capping mechanisms respectively and through the transfer mechanism. If the machine is to handle runs of bottles of the different sizes, i. e., runs of quart bottles, runs of pint bottles, etc., the guiding means, the work table conveyors, and the transfer mechanism must be adjustable to handle the various sizes of bottles. Means to provide this adjustment are used at the present time, but no very satisfactory arrangement has previously been designed for simultaneously adjusting the more important guide elements, nor do present day machines generally adjust the movement of the transfer mechanism with respect to the filling mechanism so that the transfer mechanism will accurately and exactly contact or mesh with the bottles of the different sizes presented thereto by the filling mechanism. If runs of the different sizes of bottles are to be properly centered with respect to the capping heads of the capping mechanism, it is likewise important that the transfer mechanism should be adjustable with respect to the capping mechanism to perform that function. Since the prior art machines do not provide for the adjustment of the transfer mechanism with respect to either the filling or the capping mechanisms, a considerable amount of milk is wasted due to jarring of the bottles caused by improper contact of the transfer mechanism therewith or by breakage of the bottles resulting from their improper centering with respect to the capping heads.

In order to provide a machine which is completely adjustable for runs of the different sizes of bottles, it is also desirable to include means to vertically adjust the tub or receptacle of the filling mechanism and the capping head of the capping mechanism so that these elements may accommodate runs of bottles of the different sizes.

The principal object of our invention is to provide a filling and closing machine the various mechanisms of which may be readily adjusted to properly handle runs of bottles or receptacles of the different sizes or configurations.

Another important object of the invention is to provide a transfer mechanism for moving bottles or receptacles from one mechanism of a filling and closing or similar machine to another mechanism and which transfer mechanism includes means to simultaneously adjust the position of the bottle or receptacle guiding elements so that they may properly direct runs of bottles or receptacles. The transfer mechanism is also adjustable with respect to the filling and closing or other mechanisms so that it may properly co-act with these mechanisms to handle runs of bottles or receptacles of various sizes.

Another object of our invention is to provide a filling and closing machine all of the mechanisms of which are so constructed and arranged that there will be a minimum possibility of spilling of the contents of the bottles or receptacles or breaking of any of the bottles or receptacles passed through the machine.

Another object of the invention is to provide means whereby the tub or receptacle of the filling mechanism and the capping head may be vertically adjusted to accommodate runs of bottles or receptacles of the different heights.

Still another object of the invention is to provide a machine which is equipped with a novel form of latch and cam mechanism for controlling the movement of the capping heads.

Other objects and advantages of this invention will be apparent from the following specification.

In the drawings,

Figure 1 is a plan elevation of the machine, but with the filling reservoir or tub and the capping head removed;

Figure 2 is a longitudinal vertical section taken on the line 2—2 of Figure 1 and including the filling receptacle or reservoir and the capping head;

Figure 3 is a horizontal sectional view through the entire machine, taken on the line corresponding to line 3—3 of Figure 2;

Figure 4 is a vertical sectional view of the machine taken on the line corresponding to line 4—4 of Figure 2;

Figure 5 is a vertical sectional view of the transfer mechanism of the machine taken on the line 5—5 of Figure 1;

Figure 6 is a horizontal sectional view showing certain of the gearing arrangements of the machine and with the bottle supporting plate removed;

Figure 7 is a detail view showing the means for adjusting the transfer mechanism;

Figure 8 is a detail showing the clutch operating connections of the machine;

Figure 9 is a detail side view showing the mechanism for moving the bottle holders of the filling mechanism;

Figure 10 is a view of the mechanism shown in Figure 9 but with these parts in another position;

Figure 11 is a top plan view of the capping mechanism used in our machine, showing one of the capping heads in position thereon;

Figure 12 is a vertical section through one of the capping heads used in the present machine showing the head in its lowered position;

Figure 13 is a vertical sectional view similar to Figure 12 showing the capping head in uppermost position; and Figure 14 is a diagrammatic showing or development of the cam used to control the vertical movement of the bottles while passing through the capping mechanism.

Our machine is mounted upon pedestals 15 positioned to properly support a number of large lower gear casings 16, 17 and 18, casings 16 and 17 being positioned at the opposite ends of the machine and gear casing 18 being intermediate casings 16 and 17. The three lower casings are secured together as shown in Figure 3, and as best illustrated in Figures 4 and 6, a number of smaller gear casings such as 19, 20 and 21 are secured to their upper surfaces. Upon these upper gear casings and upon various pedestals such as 22, a metal plate is supported, which plate forms the work table 23 of the machine.

Referring to Figure 1, a filling mechanism 25 of any standard type is supported for rotation adjacent one end of the work table 23 upon a vertical hollow shaft 26. At the opposite end of the work table there is provided a closure applying or capping mechanism 27 carried upon a vertical and rotating hollow shaft 28. The capping mechanism 27 may also be any one of a number of standard capping mechanisms. A notched disc conveyor element or spider 29 for guiding receptacles or bottles to the filling mechanism is provided on one side of the table adjacent an in-feed conveyor 30, and a transfer mechanism or transfer spider 31 is arranged between the filling and the capping mechanisms to move the bottles or receptacles from the former to the latter. An out-feed conveyor 32 receives the receptacles or bottles from the capping mechanism through the action of a rotating conveyor disc or spider 33 disposed on the work table 23 between the capping mechanism 27 and the out-feed conveyor 32.

Power to drive the mechanisms comprising the machine is received through a belt or sprocket drive 34 which rotates a sprocket 36 mounted at one end of a main drive shaft 35 journaled in the gear casing 18. A clutch mechanism 37 is provided to control the actuation of shaft 35, the clutch being mounted in a casing 38 fixed to the end of casing 18 and also enclosing the drive sprocket 36. Pinions 39 and 40 are fixed to the main drive shaft 35 and respectively mesh with pinions 41 and 42 which are free for rotation but held against sliding movement on a counter-shaft 43, which is likewise journaled in the casing 18. The speed at which the machine is driven may be varied by actuation of a clutch-like element 44 which is keyed for slidable movement on the counter-shaft 43 between the pinions 41 and 42 so that it may be selectively moved to engage coacting clutch teeth upon these pinions to lock the desired pinion to shaft 43. The machine will be operated at a slightly higher speed when the element 44 is moved to engage the pinion 41 and this gear will be locked to the shaft 43 when receptacles or bottles of smaller sizes, requiring less time for filling, pass through the machine.

A third pinion 45 is fixed to the counter-shaft 43 adjacent one end thereof and meshes with a pinion 46 upon a horizontal capping mechanism drive shaft 47 journaled in the casing 18 parallel with counter-shaft 43. A worm gear 48 is fixed to shaft 47 intermediate the length of the latter and is in mesh with a worm wheel 49 which is fixed to a vertically disposed tubular element 50 which is mounted for rotation upon a fixed up-standing and hollow bearing element 51 and a post 51'. The tubular element 50 is fixed to the lower end of hollow shaft 28 which carries the capping mechanism 27 hereinafter described. The filling mechanism 25 is driven from the counter-shaft 43 by means of a sprocket chain 52 connecting a sprocket 53 on the end of counter-shaft 43 with a sprocket 54 at one end of filling mechanism drive shaft 55 journaled in the gear casing 17 parallel to counter-shaft 43. A worm gear 56 on shaft 55 meshes with a worm wheel 57 fixed to a vertically disposed tubular element 58 which is fixed to the lower end of hollow shaft 26 which carries the filling mechanism. The tubular element 58 is journaled in the casing 17, bearing surfaces being provided at 59 and 60 for that purpose, and a post 58' supports the upper element 26.

Figure 6 shows the gearing or drive whereby the conveyor and transfer elements of our machine are driven. This gearing is arranged above the lower gear casings 16, 17, and 18, and beneath the work table 23.

The in-feed conveyor 31 and the conveyor disc or spider 30 which feeds the receptacles or bottles from the in-feed conveyor to the filling mechanism 25 are driven from a sprocket 61 fixed to one end of the filling mechanism drive shaft 55. A sprocket chain 62 connects sprocket 61 with a sprocket 63 on a horizontally journaled shaft 64 supported within the small gear casing 19 which is fixed above the lower intermediate gear casing 18 and beneath the work table 23. A worm gear 65 carried by shaft 64 drives a worm wheel 66 fixed to a vertically arranged shaft 67 which is journaled in the gear casing 19 and projects above the work table 23 and carries the in-feed conveyor disc 29. A bevel pinion 68 is fixed to the inner end of shaft 64 and is in mesh with a bevel gear 69 on a shaft 70 which is likewise journaled in the gear casing 19. A sprocket 71 is carried by shaft 70 exteriorly of gear casing 19 and drives a sprocket chain 72 meshing with a sprocket 73 fixed to the power shaft 74 of the in-feed conveyor 30.

The remaining conveyor and transfer mechanisms are driven from the capping mechanism drive shaft 47, power being derived from a sprocket 75 on the end of said shaft opposite to that on which the pinion 45 is mounted. A sprocket chain 76 connects sprocket 75 with a sprocket wheel 77 which is normally clutched, by means hereinafter described, to a horizontal shaft 78 supported at one end in bearings 79 and at its opposite end in gear casing 20 fixed above the lower gear casing 18 and beneath the work table 23. A worm 81 is fixed to the shaft 78 within the gear casing 20 and meshes with a worm 82 fixed to the vertically disposed shaft 83 which extends up through the work table 23 and operates the transfer mechanism 31 for moving the bottles or receptacles from the filling mechanism 25 to the capping mechanism 27. A sprocket wheel 84 is fixed to the opposite end of the shaft 78 and, through a sprocket chain 85, drives a horizontal shaft 86 journaled in small gear casing 21 supported above lower end casing 16. A worm gear 88 is fixed to shaft 86 within the gear casing 21 and is in mesh with a worm wheel 89 fixed to the vertically disposed shaft 90 which is journaled in the gear casing 21 and projects above the work table 23 and at its upper end carries the conveyor disc 33 for moving the receptacles or bottles from the capping mechanism 27 to the outfeed conveyor 32. The out-feed conveyor 32 is driven from shaft 86 by means of a sprocket 91 driving a sprocket chain 92 which turns the drive sprocket, not shown, of the conveyor.

A clutch operating lever 93 is provided to control the main driving clutch 37 and a gear shifting handle 94 is provided to operate the gear shifting mechanism 44. Clutch lever 93 is an upstanding right angled extension of a shaft 95 which extends across and is journaled for turning movement upon the upper side of gear casing 18 and carries an upwardly projecting crank arm 96 at its end opposite lever 93. As shown in Figure 8, a downwardly extending rod 97 has its upper end 98 loosely hooked in an aperture 99 in the crank arm 96. The lower end of rod 97 is threaded and is passed through a slightly oversize aperture in the stud 100. Nuts 97' are positioned on the lower end of rod 97 below stud 100, one nut being used for adjustment of rod 97 and the other acting as a lock nut. The turning of the lever 93 and shaft 95 in a counterclockwise direction as viewed in Figure 8 will allow rod 97 to pass through stud 100, thereby releasing the clutch springs to cause the clutch plates to engage and start the machine in operation. In order to be sure that the shaft 95 will remain in the position to which it is moved, we connect a second rod 106 to the crank arm 96, the connection between the two being effected by inserting the upper hooked end of rod 106 in an aperture 107 of the crank arm. The lower end of the rod 106 is fitted in an aperture in a bell crank 108 pivotally supported at one side of casing 18 as shown in Figure 8. The other arm of the bell crank 108 is adapted to receive one end of a horizontal rod 109 which extends beneath the lower casing 18 and has its inner end connected to a spring 110. The opposite end of the spring is secured to the underside of casing 18. Referring particularly to Figure 8 it will be seen from the dotted and solid line showings that in each of the two positions of the clutch operating rod 95, the upper ends of both the rod 97 and the rod 106 will be at one side of top dead center of shaft 95. The spring 110 will hold the parts in either of these positions so that it will be impossible to accidentally actuate the clutch 37 and start the machine in motion. The combined arrangement of crank arm 96, rod 106, bell crank 108, rod 109, and spring 110 form a safety device. When the clutch 37 is engaged and the machine is in operation, rod 106 is just past dead center of shaft 95 (as shown in solid lines in Figure 8) and spring 110 is in tension. The slightest pressure against the operating lever 93 will therefore cause the crank arm 96 to drop to the position shown by dotted lines in Figure 8. This is due to the fact that the tension exerted by the spring 110 will pull the arm 108' of bell crank 108 to upward position, thereby pulling rod 106 downwardly to turn crank 96 clockwise (Figure 8). Upward movement of rod 97 will result, causing the nut 97' thereon to engage the stud 100 to disengage the clutch, stopping the machine. It will be noted that the above mechanism is snap-acting, and will be actuated to disengage the clutch by an extremely slight pressure against the lever 93.

The gear shifting handle 94 is fixed to one end of a rod 111 which is slidably mounted in the upper portion of a gear casing 18 and an operating yoke 112 is fixed to rod 111 and encircles the gear connector element 44 in the usual manner. It will be obvious that the gears may be changed or set to neutral by movement of the gear shifting handle 94. We provide a hand wheel 113 on the main drive shaft 35 of the machine in order that the machine may be operated by hand whenever this may be desirable.

An emergency or slip clutch is provided on the shaft 78 which drives the transfer mechanism 31 to provide an automatic release for that mechanism. The arrangement of this clutch device is as follows:—Sprocket 77 is fixed to a sleeve 94a mounted on shaft 78. One face of the sleeve 94a is notched as at 95a and this notch is normally held in engagement with a pin 96a which extends radially from the shaft 78, a spring 97a having one end bearing against lock nuts 98a fixed to shaft 78 forcing sprocket 77 and sleeve 94a normally in locking engagement against the pin 96a, as stated above. In the event that any of the bottles passing through the transfer mechanism 31 should get out of alignment and should tend to cause a stoppage of the transfer mechanism, the notch of the sleeve 94a will slip with respect to the pin 96a and disconnect the transfer mechanism drive so that no damage to the transfer mechanism or to the bottles will result.

One of the important objects of our invention is to provide a machine which is particularly adapted to handle bottles or receptacles of various sizes and configurations. In one respect, we obtain this result by adjustment of the guiding elements on the table 23 which coact with the respective conveyors and the transfer mechanism to properly direct receptacles through the machine. In the present embodiment of the invention, the guiding elements may be fixed for bottles or receptacles of four different sizes, i. e., quart, pint, half-pint and gill sized receptacles. It may be added that in the embodiment of our machine illustrated, every part or mechanism which is adjustable is adjustable to positions to accommodate bottles of these four sizes.

Guiding elements 116 and 117 are provided on either side of the in-feed conveyor 30, and an adjustable guide 118 is pivoted to the inner end of the guide 117. By this arrangement, the pivoted guide 118 may be moved inwardly or outwardly with respect to the conveyor belt according to whether the bottles or receptacles are small or large in diameter. The receptacles must be urged somewhat to the left, as viewed in Figure 1, in order that the recesses 119 of the in-feed spider 29 will properly engage them.

The means to hold the pivoted guide 118 in position to accommodate bottles of the size which it is desired to handle comprises an angle plate 120 fixed to the lower edge of guide 118, angle plate 120 being provided with a number of apertures 121 which are adapted to be selectively placed in alignment with corresponding apertures 122 in a lower plate 123 which is fixed to the work table 23. Plate 120 may be held in proper position upon fixed plate 123 by inserting a pin 124 through the desired apertures of the respective plates when they have been properly aligned for the size adjustment desired.

An arcuate guide element 125 is positioned upon the work table 23 opposite the in-feed spider 29, the guide being positioned opposite the portion of the path of travel of spider 29 which is followed by the bottles or receptacles during their passage from conveyor 30 to the bottle holders 126 of the filler mechanism 25. Guide elements 127 and 128 are positioned on the work table 23 on each side of the path of travel which the bottles or receptacles will follow in passing from the bottle holders 126 of the filler mechanism to the bottle holders 129 of the capping mechanism 27. The guides 127 and 128 are suitably curved at their ends to properly guide the bottles or receptacles. An arcuate guide 130 is likewise provided upon the work table 23 opposite the out-feed spider 33, the guide extending along the path of travel which the bottles or receptacles must follow while under control of this spider and suitable guide elements 131 and 132 are provided on either side of the out-feed conveyor 32. As is best illustrated in Figure 1 of the drawings, the guides 125, 127, 128, and 130 are simultaneously operable to be moved to properly accommodate runs of bottles or receptacles of different sizes. The mechanism for controlling the position of the guides comprises an adjusting lever 133 which is pivoted upon a vertical stub shaft 134 journaled in work table 23. An up-standing pin 135 on lever 133 extends up into a boss 136 on a lateral extension 137 on the guide 125 with the result that movement of the lever 133 will move the guide 125. The lateral extension 137 of guide 125 is in effect a lever and extends over toward the capping mechanism 27 and is pivotally connected to one arm 138 of a bell crank lever 139 by a pin 140, bell crank lever 139 being pivoted upon a stud 141 fixed in the upper surface of the work table 23. A lever 142 journaled on a stud 143 in the work table 23 has one arm pivotally connected to the lateral extension 137 and to the arm 138 of bell crank 139 by the pin 140. The free end 144 of lever 142 is pivotally connected to a lug 145 on the guide 130 by means of a pin 146. It will be obvious from the above that any movement of the guide adjusting lever 133 will also move guide 130 with respect to the conveyor spider 33.

The guide element 127 which bounds the outer edge of the path of travel through the transfer mechanism 31 has lugs or ears 147 and 148 fixed to its rear side. Lug 147 is pivotally connected to a crank 149 fixed to adjusting lever 133 and lug 148 is pivotally connected to the arm 150 of the previously described bell crank lever 139. The guide 128 which is mounted closely adjacent the transfer mechanism 31 to define the inner edge of the path of travel through that mechanism has a lug 151 fixed to its rear face and a link 152 beneath the work table 23 extends from this lug to a crank arm 153 fixed to adjusting lever 133. Link 152 is pivotally connected to lug 151 and crank 153 by pins extending through arcuate slots in the work table 23, as shown. A bell crank lever 154 is pivoted on the work table 23 behind the guide plate 128 and has one arm thereof pivoted to lug 151 while its other arm is pivoted to a second link 155 which extends parallel to guide 128 and is pivoted to one arm of another bell crank 156. Bell crank 156 is likewise mounted for swinging movement on the work table 23 and the other arm thereof is pivoted to a second lug 157 fixed to the guide 128.

From the above description of the various elements whereby the positions of the guides 125, 130, and 127, 128, are adjusted, it will be understood that swinging movement of the adjusting lever 133 upon its pivot point or axis 134 will simultaneously effect a corresponding movement of the various guides. The guides 125 and 130 will be moved either toward or away from the peripheries of the conveyor spiders 29 and 33 while the guides 127 and 128 which cooperate with the transfer mechanism 31 will be moved toward or away from each other.

The position of each of the respective guides will, of course, be adjusted to a like degree by movement of the adjusting lever 133. In order to permit the guides to be set for the four sizes for which the present machine is designed, we have provided four apertures 158 in the work table 23, the apertures being arranged in an arcuate row as shown in Figure 1. A handle 159 is fixed to the free end of adjusting lever 133 and the latter may be moved to the desired position by means of the crank handle 159 and the pin 160 may then be dropped into the aperture 158 with which the crank handle is aligned.

A stoppage of the bottles passing through the in-feed conveyor disc 29 will sometimes occur and we provide means adjacent the in-feed side of this disc to permit the bottles to pass to the left and clear of the conveyor disc whenever such a stoppage occurs. This means comprises a strip of spring metal 161 which is secured at one end to a lever 162 pivoted to the work table at 163. The free end of the spring metal strip 161 projects toward a spring metal strip 164 secured to the guide plate 125. If a stoppage of the bottles occurs and the in-feed conveyor 30 continues to move bottles onto the work table, these latter bottles will accumulate on the work table 23 against the spring plates 161 and 164. This will cause the lever 162 to swing outwardly on its pivot 163 so that bottles may slide out on the work table 23 until the condition is noticed by the attendant and the conveyor stopped. It will be noticed that a stop pin 165 is provided on the work table 23 to hold lever 162 and the spring strip 161 in proper position with respect to the in-feed conveyor disc 29.

In order to properly guide bottles of different sizes from the conveyor disc 33 to the out-feed conveyor 32, it may be necessary to move the out-feed end 130' of the guide 130 either inwardly or outwardly with respect to the periphery of the spider 33. This may be accomplished by means of a lever 166 pivoted at 167 upon a bracket 167' fixed to the guide 131 of the out-feed conveyor 32. The inner end of lever 166 is pivotally connected to a lug 168 on the rear side and adjacent the outer end 130' of guide 130. Movement of lever 166 will, of course, swing guide 130 on its pivot 146 to vary the position of the outer end 130'. Notches 169 are provided in a plate 169' fixed to guide plate 131 so that lever 166 may be held in the desired adjustment.

The filling mechanism 25 used in our machine is of a well known type and comprises a plurality of reciprocating platforms or bottle holders 126 which move the bottles 170 upwardly against the usual filling valves or tubes 171 on the underside of the filling tub or receptacle 172. A filling tube 171 of well known construction will be provided in alignment with each of the bottle holding platforms 126. As is best shown in Figure 2, each of the bottle holding platforms is provided with a depending cylindrical guide member 173 which is vertically slidable in and keyed to a cylindrical standard 174 fixed to the base 175 of the filling mechanism. The base 175 is fixed to the hollow tubular element 58. Referring to Figures 9 and 10, a stub shaft 176 is journaled in the hollow tubular stand 58 beneath each of the cylindrical guide members 173, and a bell crank lever device 177 is fixed to each of the stub shafts. The upper arm 178 of each of the bell crank devices 177 is connected to the cylindrical guide 173 by means of a pivoted link 179. When the bottles are received upon the platforms 126, the platform is at its lowermost position, flush with the work table 23, and the link and bell crank are in the position shown in Figure 9. When the platform has been rotated to a position where the filling operation is to begin, the lower arm 180 of the bell crank 177 will be projected downwardly and will come into contact with a lifter roller which is mounted on a movable bracket 181'. This bracket is clamped to the gear casing 17 by means of a clamping bolt and may be moved to the right to allow more time for filling or may be moved to the left to decrease the filling time. Contact of the arm 180 with the lifter roller will rotate the bell crank to the position shown in Figure 10 and will move the link 179 and platform 126 upwardly so that the bottle 170 will press upwardly against tube or valve 171 and milk will flow into the bottle. It will be noted from Figure 10 that when the bottle holder is in this upward position, the upper arm 178 of the bell crank 177 will have moved past upper dead center position so that the holder will remain in upper position. Rotation of the platform 175 will move the bell crank trip pin 177' against a lowering trip 176' which is fixed to the drip trough of the machine at the point at which the filling operation is to terminate. As shown in Figure 10, the lowering trip 176' is so positioned that the bell crank trip pin 177' will pass beneath it. This starts the rotation of the bell crank around the shaft 176 to initiate the lowering of the platform 126. As the filling mechanism continues to rotate, the trip pin 177' travels gradually down the lowering trip cam 176' bringing the platform 126 flush with the work table 23. The lowering trip cam 176' is pivoted to a bracket which is fixed to the gear casing 17 so that in case the bottle platforms 126 should accidentally be at their lowest position when they come opposite the cam 176', the trip pin 177' will pass under the lowering trip cam 176' and raise it without causing any damage to the mechanism.

The transfer mechanism or transfer spider 31 employed in our machine for removing the bottles or receptacles from the bottle holders 126 of the filling mechanism 25 and placing them upon the bottle holders 129 of the capping mechanism 27 comprises a horizontally disposed endless chain element 185 driven by a sprocket 186 carried by the vertically disposed shaft 83, the opposite end of the endless chain element 185 being adapted to enage and move about an idler sprocket 187 which is rotatably mounted upon a stub shaft 188 which is held in an oblong bearing 189 in the surface of the work table 23 by means of nut and washer 188', as shown in Figure 5. The set screw 190 is an adjusting screw and is used to adjust the idler sprocket 187 and take out any slack in the endless chain 185 due to wear. The endless chain 185 is preferably provided with arms forming transfer pockets 191 which are so spaced along the chain 185 that they will properly coact with the bottle holders 126 of the filling mechanism. When a bottle holder 126 presents a filled bottle 170 at the inlet end 192 of the transfer guides 127 and 128, a transfer arm 191 will instantly contact with the rear side of the bottle and will move it clear of the bottle holder 126 in a circular path between the inlet end of guides 127 and 128. The transfer arm 191 will move the bottle along between the guides 127 and 128 to the bottle holder 129 of the capping mechanism which will at that moment be in proper position to receive the bottle. In filling and capping machines, the filling tub or receptacle and the platform which supports the bottle holders are generally of a relatively large diameter and move at a relatively low linear speed, while the capping mechanism is generally of smaller diameter and carries a smaller number of bottle holders and capping mechanisms, the result being that the capping mechanism must rotate at a relatively high speed to keep pace with the operation of the filling mechanism. It follows from this that the means to transfer the bottles from the filling mechanism to the capping mechanism must be arranged to compensate for this difference in speeds but without too suddenly accelerating the movement of the filled but uncapped bottles. Our use of an endless chain conveyor with projecting transfer arms 191 is particularly efficient in this respect. We preferably drive the transfer mechanism at the same speed as the capping mechanism, the two being geared together in the manner previously described. It will be noted from Figure 1 that the transfer arms of pockets 191 are of general right angled configuration, one arm 194 of the right angle being secured to the chain 185, while the other arm 195 projects from the chain. The result is that when the transfer arms 191 are moving in a circular path about the sprockets 186 and 187 the free end of the projecting arm 195 will move at a somewhat higher linear speed than when it is moving in a straight path between the two sprockets. The transfer arms 191 contact with the bottles 170 at the inlet end 192 of the guides 127 and 128 at a moment when the transfer arms are moving in a circular path. It follows from this that the bottle is rapidly but smoothly moved from the bottle holder 126 and on to the work table 23 and that the arm 191 will quickly move from the path of the next succeeding bottle. When the transfer arm 191 moves the bottle 170 upon the aligned bottle holder 129 of the capping mechanism at the end of the guides 127 and 128, the rotation of the capping mechanism will immediately move the bottle 170 away from the transfer arm 191 but the final contact of the outer end or tip 191' of the transfer device 191 will determine the positioning of the bottle upon the bottle platform 193 and will serve to center the bottle on the platform so that it will be in proper alignment with the capping mechanism.

It is obvious that the transfer arm and mechanism must be constructed or set to exactly contact or mesh with the bottles passed through the machine, and if it is intended to pass runs of bottles of various sizes through the machine, the transfer mechanism must be adjustable to accurately contact or mesh with bottles of the diameter to be passed through the machine. We have accomplished this result by adjusting the position of the transfer arms or transfer pockets 191 with respect to the driving mechanism of the sprocket 186. By this action we of course likewise adjust the position of the transfer mechanism with respect to the filling mechanism and the capping mechanism. When the transferred arms or pockets are set for a bottle of one diameter and it is desired to reset them for a bottle of a smaller diameter, it is necessary to move the transfer arms forward (or counter-clockwise as viewed in Figure 1) a distance corresponding to one half the difference between the diameters of the two sets of bottles. The transfer mechanism 31 is constructed to obtain this adjustment by an adjustable connection with its drive shaft 83 as best shown in Figures 1, 5, and 7.

Sprocket 186 is loosely mounted upon the shaft 83 and is placed in locked engagement with the shaft by means of a pin 196 which is inserted in apertures 197 in the sprocket 187 and passes into corresponding apertures 198 provided in a disc 199 which is fixed to the shaft 83. It will be noted from Figure 5 that the disc 199 is of somewhat smaller diameter than the sprocket 187 and that the latter has downwardly projecting flanges 200 which surround the disc and carry the necessary sprocket teeth. In the present machine four apertures 197 are provided in the sprocket 187, each aperture being intended for the setting of the transfer mechanism to accommodate bottles of a different size, i. e. quarts, pints, half pints and gills. A corresponding number of apertures 198 is provided in the disc 199 and the relation of these apertures is such that when the sprocket is disengaged from the disc 199 by removal of the pin 198 for movement to another setting, the circumferential movement of the sprocket with respect to the disc which will be necessary to place the aperture 197 which is to be used in alignment with its corresponding aperture 198 of the disc will be exactly sufficient to advance or retract the arms 191 the proper distance to instantly contact with bottles of the size for which the transfer mechanism is set when such bottles are presented to the transfer mechanism at the in-feed end 192. The tips 191' will then likewise properly center the bottles on the capper bottle holders 129.

It is also desirable to adjust the position of the conveyor spider 33 with respect to the closure applying mechanism 27, so that the notches 201 of the spider will properly contact with the bottles 170 which are presented thereto by the platforms 129 of the capping mechanism. This is accomplished by turning the spider 33 with respect to its driving shaft 77 a distance to correspond to the differences in the diameters of the various runs of bottles which may be passed through the machine. Spider 33 is loose upon the shaft 77 and is held in locked engagement therewith by a pin 202, which may be selectively positioned in apertures 203 in a plate 204 fixed to shaft 77. The spider 33 is provided with apertures 205 which may be selectively aligned with the proper aperture of plate 204 to properly position the spider with respect to the bottles which it is to receive from the capping mechanism 27. In the present machine, the spider 33 and the plate 204 are each provided with four apertures, one for each of the four sizes for which the present embodiment of our machine is designed. It will be noted that a very slight rotation of spider 33 is necessary to align the corresponding apertures of the plate and the spider.

The vertical positioning of the filling tub or receptacle and the capping heads so that they will be in proper position for bottles of the different sizes for which our machine is designed, is preferably controlled by gearing which raises or lowers these devices to accommodate bottles of the different heights. The filling tub or receptacle 172 is provided with a central depending tubular element 206 which is provided with keys 207 to interfit with keyways 208 on an upstanding sleeve 209 fixed to the central portion of the table 175. By this arrangement, the tub or receptacle will be rotated with the hollow tubular element 58 and table 175, but will be adjustable for vertical movement with respect to the latter. The vertical adjustment of the tub or receptacle is controlled by the post 58' which extends up into the depending tubular element 206 and is provided with a thrust bearing at its upper end to permit the tub or receptacle to be freely rotatable thereon. The lower end 210 of post 58' is threaded into a bevel gear 211 mounted in the lower portion of the gear casing 17. Bevel gear 211 meshes with a bevel gear 212 mounted at the inner end of a stub shaft 213 journalled in the casing 17, the shaft 213 being provided with a sprocket 214 at its outer end which is driven from an upper operating stub shaft 215 by means of a sprocket chain 216. Shaft 215 is likewise journalled in the casing 17 and may be rotated by a hand crank to raise or lower the tub or receptacle to the proper position. Position indicating notches 217 may be provided on the upstanding collar 209 to cooperate with a depending sleeve 218 fixed to the tub or receptacle to move upon the outer surface of the collar 209.

The capping mechanism 27 includes a table portion 219 which is fixed to the upper part of the hollow tubular member 50. The hollow shaft 28 is fixed to the table 219 and projects upwardly therefrom, as shown in Figure 2. These three elements have no vertical movement, and are journalled to rotate in fixed relation upon the fixed sleeve 51 and an annular bearing or track 220 fixed to gear casing 16. The capping head supporting arms 221 are fixed to a sleeve 222 rotatably supported upon the upper portion of the fixed post 51' on bearings 223 adjacent the upper end of the post. The post 51' is vertically movable, being threaded at its lower end 224 to engage a bevel gear 225 rotatably supported within the fixed sleeve 51. A second bevel gear 226 is journalled on a horizontal stub shaft 227 journalled in the gear casing 16. Shaft 227 may be rotated from an operating shaft 228 by means of a sprocket 229 and sprocket chain 230. It will be obvious that the rotation of the shaft 228 will vertically adjust the position of the post 51' to raise or lower the capping head supporting arms 22. A depending sleeve 231 is fixed to the capping head support 222 and is movable along the hollow shaft 28. Raising or lowering of the capping head supporting sleeve 222 will move the sleeve 231 along the hollow shaft 28 and the position of the lower edge 232 of sleeve 231 with respect to notches 233 on the hollow shaft 28 will indicate the vertical adjustment of the capping heads. Sleeve 231 is split at 234 and may be clamped to shaft 28 by a bolt 235 so that the capping heads will rotate with the table 219. A flanged disc 236 is keyed at 237 to the extreme upper end of the post 51' for a purpose hereinafter described.

The bottles 170 are fed to the cap applying mechanism 27 by the transfer mechanism 31, the arms 191 of the transfer mechanism moving the bottles 170 from the worktable 23 to one of the four platforms 129 of the capping mechanism. The platforms 129 are arranged to vertically reciprocate in the rotating table 251, the platforms 129 including cylindrical members 252 fixed to their lower surfaces, which cylinders are fitted in sockets 253 in the table 219. Pins 254 fitted in the table 219 extend across the sockets 253 and through slots 255 in the cylindrical members 252. The cylindrical members 252 are provided with rollers 256 at their lower extremities, which move upon a cam track 257 fixed in the gear casing 16. The rotation of the tubular member 50 and the table 251 by the driving gearing of the machine will cause the platforms 129 to rise and fall to coact with capping heads 258, one of which is carried by each of the supporting arms 221 in alignment with the respective bottle holders 129. Referring particularly to Figure 12, which shows the capping head preferably used in our machine, the numeral 259 designates a throat carrier in the form of a cylindrical sleeve having a bore 260, the sleeve being keyed to slide in a vertical bore 261 provided adjacent the end of each of the supporting arms 221. The throat carrier 259 has a lateral extension 262 at its lower end to which is pivoted at 263 a platform or slideway 264. A pivoted latch 265 serves to hold the platform 264 in its normal position shown in Figure 12. The lateral extension 262 has an aperture 266 therein and a disc holding cylinder 267 extends upwardly from the lateral extension in alignment with this aperture. A presser foot 268 is mounted in a lower enlarged portion or throat chamber 269 of the throat carrier 259. The presser foot 268 has a lower head 270 and an upper head 271, the upper head being supported upon a presser foot plate or collar 272 provided with throat closing pins 272', as shown, extending upward and through apertures 258' in the throat carrier. This collar rests upon a collar 273 which forms the throat of the capper head and which is in turn supported upon a collar 274 supporting spring 275 rests upon a plate device 276 fitted upon the lower end of the throat carrier 259. The bore 260 of the throat carrier 259 is restricted at 277 and a presser foot spindle 278 is mounted in this restricted portion. The lower end of the presser foot spindle rests upon the presser foot 268 and its upper portion is headed at 279 to hold it in position in the restricted portion 277. The presser foot spring 280 within the bore 260 bears upon the spindle head 279, the upper end of the spring being in contact with a nut 281. Nut 281 is threaded in the upper end of the bore 260 and preferably has a central bore 282 in which a set screw or jam nut 283, is threaded. The lower portion of the nut 281 is radially split so that it may be expanded by the set screw 283 and thereby held in adjusted position.

The throat 273 is of a design which will shape or mold a blank disc 284 about the mouth of the bottle 170 to form a cap of the crown type thereon. The throat 273 is in the form of a cylindrical sleeve or collar and is made up of a number of segments 285, each of which is provided with a shoulder 286 at its upper end and a shoulder 287 at its lower end, the assembly of these segments thus forming a collar or throat element which has outwardly projecting flanges at its upper and lower ends. The outer surfaces of the upper shoulders 286 are grooved and a split and very stiffly resilient ring 288 is fitted in this groove. As has been previously indicated, the throat 273 is supported by the collar 274, the split ring 288, which surrounds the upper flange 286 of the throat, resting upon a shoulder 289 on the collar 274 to properly support the throat. Throat 273 projects downwardly about the presser foot 268, the lower surface of the presser foot and the lower edge of the throat normally being flush with each other as shown in Figure 12. A coil of stiff wire 290 encircles the outer periphery of the throat 273 between the shoulders 286 and 287, this coil and the stiff split ring 288 holding the segments 285 in sleeve form. As is shown in Figures 12 and 13, the upper ends of the segments 285 are slightly beveled downwardly and outwardly so as to have substantially a single point of contact 291 with the underside of the presser foot plate 272, thereby permitting the segments 285 to swing outwardly very slightly at their lower ends when a bottle is forced up into the throat 273.

The platform 264 has an aperture 292 therein which is beneath and in alignment with the throat chamber 269. A sleeve 293 is fitted in the aperture 292, the upper end of this sleeve being flanged inwardly at 294 as shown to form a platform plate which supports the blank discs 284 in position beneath the presser foot 286. The blank discs 284 are fed into position on the flange 294 by a pusher finger 295 which is carried by a pusher finger block 296 movable in a slideway 297 within the platform 264. The pusher finger block 296 moves beneath the open end of the aperture 266 in the lateral extension 262 of the throat carrier and disc feeding mechanism within this lateral extension permits the disc to be dropped upon the upper surface of the platform 264 to be moved by the pusher finger 295 into position upon the platform plate 294.

The mechanism for feeding the blank discs 284 down onto the upper surface of the platform 264 preferably comprises a plurality of oscillating finger devices 298 mounted in radial cut-outs or apertures 299 in the upper surface of the lateral extension 262 beneath the lower end of disc holding cylinder 267. Each of the oscillating finger devices 298 has a downwardly projecting pin 300 thereon which fits in a small vertical bore 301 in the lateral extension 262, the pin 300 serving as an axis for the oscillating finger device. The outer ends of the oscillating finger devices are slotted at 302 and downwardly projecting pins 303 carried by a ring 304 rotatable about the lower end of cylinder 267, project into these slots with the result that rotation of the ring 304 will swing the oscillating finger devices to cause them to oscillate on their axes 300. The inner end of each of the oscillating finger devices 298 is in the form of a fish-tail and comprises two fingers 305 and 306 laterally offset with respect to each other, finger 305 being spaced above finger 306 a distance corresponding to the thickness of the blank discs to be used for capping. Finger 305 is rounded on its upper surface and flattened on its lower surface, while the upper surface of the finger 306 is flattened. The lower surface of finger 306 may be rounded. The ring 304 is adapted to be oscillated by a lever and latch arrangement hereinafter described in such a way that its oscillations will be synchronized with the movement of the pusher finger block 296. When the pusher finger block 296 is at the extreme right end of its stroke (as shown in Figure 13), the lower fingers 306 of the oscillating finger devices 298 will be projected into the bore of the aperture 266 of lateral extension 262 and the lowermost disc of the stack of discs supported in the cylinder 267 will rest upon these fingers. The next succeeding movement of the pusher finger block 296 to the left (as shown in Figure 12) will, by the arrangement hereinafter described, move the oscillating finger devices so that the lowermost finger 306 will move out of the aperture 266 as the upper finger 305 moves into the aperture and immediately above the lowermost disc 284. The movement of lower finger 306 from beneath the lowermost disc 284 and out of the aperture will permit the disc 284 supported thereon to drop down upon the upper surface of the pusher finger, while the next succeeding disc in the stack will come to rest upon the upper surfaces of the upper fingers 305. When the pusher finger block 296 moves again to the right, the upper fingers 305 will be caused to turn out of the aperture 266 and the disc 284 which has been supported thereby will drop down into position upon the lowermost fingers 306 which have been turned to project into the aperture 266.

In order to properly center the necks of the bottles within the sleeve 293, a plurality of centralizing guides 293' may be positioned in vertical slots spaced about the sleeve 293. Small spiral coil springs encircle the rear of sleeve 293 to hold the guides 293' and force them inwardly and toward the center of the sleeve. The operation and means for operating the above device is as follows:—

The transfer arms 191 which move the bottles or receptacles 170 upon the bottle holders 129, position the bottles substantially in alignment with the sleeve 293 and throat 273 of the capping head, the bottle holder 129 being at that moment in its lowermost position and the mouth of the bottle being just below the lower surface of platform 264. Figure 14 shows the configuration of the camway 310 used in our machine and, at the moment the bottle is received upon a holder 129, the cam roller 256 of that holder will be at the point 311 indicated on Figure 14. Rotation of the table 219 to move the bottle holder with respect to the camway 310 will cause the incline 312 of the camway to first force the bottle holder and bottle upwardly so that the mouth of the bottle will be moved into the sleeve 293 to the successive positions shown in solid and dotted lines in Figure 12. As the upward movement of the bottle holder upon the camway 312 continues, the capping head will be moved upwardly in the arm 221 so that the throat closing ring 314 will be brought into contact with the underside of arm 221. Since the upper ends of the throat closing pins 272' are in contact with the lower side of the ring 314, these pins will act upon the presser foot collar 272 to force the throat 269 downwardly against the action of spring 275 to provide a minimum clearance between the lower end of the throat 269 and the flange 284' of the cap blank 284. The bottle holder will now be at point 313 on cam 310. At this point in the operation of the capping head, the upper end 316 of a pivoted latch lever 317 will be drawn into engagement with a latch block 318 secured to the upper surface of the supporting arm 221 by the action of a spring 316'. The capping head will thus be held rigid against either upward or downward movement. The upward movement of the capping head just described also actuates levers to move the pusher block 296 from the position shown in Figure 12 to that shown in Figure 13.

The mechanism whereby this is accomplished comprises two bell crank levers 319 pivoted at 320 upon the ends of a pin 321 which extends transversely through the supporting arm 221 adjacent the end thereof, as shown. The bell crank levers 319 have relatively long downwardly extending arms 322 which are pivoted at their lower ends to links 323. The outer ends of the links 323 are connected to the pusher block 296 by a pin 324 extending through pusher block 296 and through slots 325 in the side walls of the platform 264. The horizontally disposed arms 326 of the bell crank 319 are relatively short and carry rollers 327 at their outer ends, these rollers being seated between vertically spaced lugs 328 and 329 projecting from the side walls of the disc holding cylinder 267. When the capping head moves upwardly from the position shown in Figure 12 to that shown in Figure 13, the bell crank levers 319 will be swung upwardly and to the right due to the pressure exerted against the rollers 327 by the lower lugs 328. This movement of the levers 319 will move the pusher block 296 to the right as shown in Figure 13. A horizontally arranged latch lever 330 (see Figure 11) carried by the vertically extending arm 322 of one of the bell crank levers 319 engages a pin 331 projecting from the oscillating finger operating collar 304. The movement of the pusher block 296 to the right by the bell cranks 319 will cause the latch 330 to swing the pin 331 to the right, rotating the collar 304 and changing the position of the oscillating fingers 305 and 306 so that the lowermost disc in the stack in cylinder 267 will be dropped from the upper fingers 305 upon the lower fingers 306. The disc 284 resting on top of the pusher finger 295 in Figure 12 will drop down in front of the finger as shown in Figure 13.

Continued rotation of the platform 219 will cause the cam roller 256 of the bottle holder 129 to be suddenly moved upward upon the incline 332 to the extreme uppermost portion 333, as indicated in Figure 14. This upward movement is rather sharp and sudden and the mouth of the bottle 170 will be given a corresponding upward movement to the position shown in Figure 13. Since the capping head has been fixed against any further upward movement, the upward force exerted by the bottle 170 will act upon the presser foot 268, forcing the latter upwardly against the action of the presser foot spring 280. The mouth of the bottle will carry the central portion of the cap disc 284 upwardly with it, but the upward movement of the outer circumference of the cap 284 will be resisted by the throat element 273 and as the bottle moves upwardly, the throat will iron the outer circumference of the cap down about the outer portion of the mouth of the bottle in the manner shown in Figure 13. It will be noted from Figure 13 that the segments 285 of the throat will swing slightly outwardly in accomplishing this ironing action.

Continued rotation of the table 219 will cause the cam roller 256 to move down the incline 334 of the camway 310, permitting the bottle holder 129 to drop quite rapidly and the presser foot spring 280 will force the bottle 170 to drop downwardly with the bottle holder so that the mouth of the bottle will be down below the lower surface of the platform 264. Almost immediately thereafter the bottle will move into engagement with the outfeed spider 33 which will move the bottle 170 from its bottle holder 129 and onto the work table 23 for removal from the machine. As the platform 219 continues to rotate, the upper end

316 of the capping head latch 317 will be struck by a trip member 335 projecting from the stationary disc 236 at the upper end of the post 51'. The weight of the capping head will immediately cause it to drop with respect to its supporting arm 221 and the downward pressure exerted by the upper lug 329 of the disc holder 267 will cause the bell crank 319 to rotate downwardly and to the left, resulting in movement of the pusher block 296 to the left to present the cap disc 284 in front of it beneath the presser foot 268. The latch 330 will also cause the collar 304 to be rotated to swing the lowermost operating finger 306 out of the disc aperture 266, permitting the lowermost disc which has been supported thereon to drop down upon the upper surface of the pusher finger 295 as shown in Figure 12. At the same time, the upper fingers 305 will be swung into the aperture to support the stack of discs.

We claim:—

1. In a receptacle filling and closing machine, a rotary filling mechanism, a rotary closing mechanism, an endless conveyor for moving receptacles from the filling mechanism to the closing mechanism, said conveyor moving about vertical axes and arranged to move receptacles in a substantially straight line from the filling mechanism to the closing mechanism, the position of said conveyor with respect to the filling and closing mechanisms being adjustable to accommodate receptacles of various diameters.

2. In a filling and closing machine including a work table, a filling mechanism at one portion of the work table, a closing mechanism at another portion of the work table, transfer means to move receptacles upon the work table from the filling mechanism to the closing mechanism, in-feed conveyor means to move receptacles upon the work table to the filling mechanism, out-feed conveyor means to move receptacles upon the work table from the closing mechanism, guide means upon the work table to cooperate with the in-feed conveyor, guide means upon the work table to cooperate with the out-feed conveyor, a plurality of guide means adjacent the transfer means to guide receptacles through the transfer means and means to simultaneously adjust the position of said first two guide means with respect to the conveyor means with which they cooperate and to adjust the position of said transfer guide means with respect to each other.

3. The combination in a filling and closing machine, of a filling mechanism, a closing mechanism, transfer means to move receptacles from the filling mechanism to the closing mechanism, infeed conveyor means to move receptacles to the filling mechanism, outfeed conveyor means to move receptacles from the closing mechanism, guide means to cooperate with said conveyor means, a plurality of guide means adjacent the transfer means to guide receptacles through the transfer means, and means to simultaneously adjust the position of said first two guide means with respect to the conveyor means with which they cooperate and to adjust the position of said transfer guide means with respect to each other.

4. In an apparatus of the class described, a pair of mechanisms for performing operations upon receptacles, a transfer mechanism to move receptacles from one of said first-named mechanisms to the other, said transfer mechanism comprising an endless chain having radially projecting receptacle engaging elements thereon and movable about sprockets carried respectively upon a vertical drive shaft and a vertical idler shaft, the position of the sprocket upon said drive shaft being selectively adjustable to vary the positions of said receptacle engaging elements with respect to said first-named mechanisms.

5. In an apparatus of the class described, a pair of rotary mechanisms for performing operations upon receptacles, an endless conveyor for moving receptacles from one of said mechanisms to the other, said conveyor moving about spaced axes and arranged to conduct receptacles in a substantially straight line from one of said mechanisms to the other, the position of said conveyor with respect to said mechanisms being adjustable to accommodate receptacles of various diameters.

6. In an apparatus of the class described, the combination of a pair of mechanisms for performing successive operations upon receptacles, transfer means to move receptacles from one of said mechanisms to the other, conveyor means to move receptacles to one of said mechanisms and to remove receptacles from the other of said mechanisms, guide means to cooperate with said conveyor means, guide means adjacent said transfer means to guide receptacles therethrough, and means to simultaneously adjust the position of said first-named guide means and said transfer guide means.

7. In an apparatus of the class described, a pair of rotary mechanisms for performing operations upon receptacles, a transfer mechanism for moving receptacles from one of said first-named mechanisms to the other comprising an endless flexible member, a pair of rotary members about which said endless member moves, the axes of said rotary members being on a line substantially parallel to the line on which the axes of said two first-named mechanisms are positioned, the path of travel of said endless member being curved about said rotary members, receptacle engaging elements carried by said endless member, said mechanisms being so positioned with respect to each other that said receptacle engaging elements will move into the paths of travel of said two first-named mechanisms while moving about the curved portions of the path of travel of said endless member.

8. In an apparatus of the class described, a pair of mechanisms for performing operations upon receptacles arranged on vertical axes, a horizontally arranged transfer mechanism for moving receptacles from one of said first-named mechanisms to the other comprising an endless flexible member, a pair of rotary members about which said endless member moves, the axes of said rotary members being vertical and on a line substantially parallel to the line on which the axes of said two first-named mechanisms are positioned, the path of travel of said endless member being curved about said rotary members, radially projecting receptacle engaging elements carried by said endless member, said mechanisms being so positioned with respect to each other that said receptacle engaging elements will move into the paths of travel of said two first-named mechanisms while moving about the curved portions of the path of travel of said endless member.

GEORGE J. HUNTLEY.
JOHN S. BARTLEY.